US006594373B1

(12) United States Patent
Gustafson (10) Patent No.: US 6,594,373 B1
(45) Date of Patent: Jul. 15, 2003

(54) MULTI-CARRIER WATERMARKS USING CARRIER SIGNALS MODULATED WITH AUXILIARY MESSAGES

(75) Inventor: Ammon E. Gustafson, Beaverton, OR (US)

(73) Assignee: Digimarc Corporation, Tualatin, OR (US)

( * ) Notice: Subject to any disclaimer, the term of this patent is extended or adjusted under 35 U.S.C. 154(b) by 116 days.

(21) Appl. No.: 09/619,266

(22) Filed: Jul. 19, 2000

(51) Int. Cl.[7] .................................................. H04K 1/00
(52) U.S. Cl. ....................................... 382/100; 380/252
(58) Field of Search ................................. 382/100, 232; 380/210, 252, 287, 54; 713/176

(56) References Cited

U.S. PATENT DOCUMENTS

| | | | |
|---|---|---|---|
| 5,901,178 A | * 5/1999 | Lee et al. | 375/240 |
| 5,946,414 A | * 8/1999 | Cass et al. | 382/183 |
| 6,044,156 A | * 3/2000 | Honsinger et al. | 380/54 |
| 6,044,182 A | * 3/2000 | Daly et al. | 382/284 |
| 6,078,664 A | * 6/2000 | Moskowitz et al. | 380/28 |
| 6,154,484 A | * 11/2000 | Lee et al. | 375/130 |
| 6,154,571 A | * 11/2000 | Cox et al. | 382/250 |
| 6,332,031 B1 | * 12/2002 | Rhoads et al. | 382/100 |

FOREIGN PATENT DOCUMENTS

| | | | | |
|---|---|---|---|---|
| WO | WO 99/36876 A2 | * 7/1999 | | G06K/9/00 |
| WO | WO 99/39344 A1 | * 8/1999 | | G11B/20/00 |
| WO | WO 00/33282 A1 | * 6/2000 | | G09C/5/00 |

OTHER PUBLICATIONS

Bender et al., "Techniques for Data Hiding," *Proc. SPIE vol. 2420: Storage and Retrieval for Image and Video Databases III*, Mar. 1995, pp. 164–173.*
Burgett et al., "Copyright Labeling of Digitized Image Data," *IEEE Communications Magazine*, vol. 36, No. 3, Mar. 1998, pp. 94 100.*
Lu, C.–S. et al., "Highly Robust Image Watermarking Using Complementary Modulations," *Proc. 2nd Information Security Workshop, LNCS vol. 1729*, Nov. 1999, pp. 136–153.*
Lu, C.–S. et al., "Cocktail Watermarking on Images," *Proc. 3rd Information Hiding Workshop, LNCS vol. 1768*, Sep./Oct. 1999, pp. 333–347.*
Mobasseri, B. G., "Exploring CDMA for watermarking of digital video," *Proc. SPIE vol. 3657: Security and Watermarking of Multimedia Contents*, Jan. 1999, pp. 96–102.*
Fridrich, J., "Combining low–frequency and spread spectrum watermarking," *Proc. SPIE vol. 3456: Mathematics of Data/Image Coding, compression, and Encryption*, Jul. 1998, pp. 2–12.*

* cited by examiner

*Primary Examiner*—Andrew W. Johns
(74) *Attorney, Agent, or Firm*—Joel R. Meyer; Digimarc Corporation (57) ABSTRACT

A watermark embedder encodes auxiliary information, such as a binary message, into a host media signal by modulating message signals with two or more corresponding carrier signals to form a watermark signal and embeds this signal into the host. A compatible watermark decoder uses the carrier signals to demodulate the message signals from the watermarked signal.

19 Claims, 10 Drawing Sheets

Single Carrier: Baseband                4 Carriers

Fig. 4

| 1/2 | 1/2 |
|---|---|
| 1/2 | 1/2 |

Carrier$_{0,0}$

| 1/2 | -1/2 |
|---|---|
| 1/2 | -1/2 |

Carrier$_{1,0}$

| 1/2 | -1/2 |
|---|---|
| -1/2 | 1/2 |

Carrier$_{1,1}$

| 1/2 | 1/2 |
|---|---|
| -1/2 | -1/2 |

Carrier$_{0,1}$ $C_{0,0} = 1/2$ $C_{1,0} = 1/2\cos(\omega_{50cyc/in}x)$ $C_{1,1} = 1/2\cos(\omega_{50cyc/in}x)\cos(\omega_{50cyc/in}y)$ $C_{0,1} = 1/2\cos(\omega_{50cyc/in}y)$ Waveform = $f_0 C_{0,0} + f_1 C_{1,0} + f_2 C_{1,1} + f_3 C_{0,1}$

MULTI-CARRIER WATERMARKS USING CARRIER SIGNALS MODULATED WITH AUXILIARY MESSAGES

RELATED APPLICATION DATA

This application is related to U.S. patent application Ser. No. 09/503,881, filed Feb. 14, 2000, which is hereby incorporated by reference.

TECHNICAL FIELD

The invention relates to encoding and decoding messages in media such that changes resulting from the encoding process are imperceptible to humans yet recoverable by an automated decoding process.

BACKGROUND AND SUMMARY

Digital watermarking is a process for modifying media content to embed a machine-readable code into the data content. The data may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including documents (e.g., through line, word or character shifting), software, multi-dimensional graphics models, and surface textures of objects.

Digital watermarking systems have two primary components: an encoder that embeds the watermark in the media content, and a decoder that detects and reads the embedded watermark. The encoder embeds a watermark by altering data samples of the media content. The reading component analyzes content to detect whether a watermark is present. In applications where the watermark encodes information, the reader extracts this information from the detected watermark.

The invention provides a system and related methods for encoding and decoding watermarks from media signals, including image and audio signals, using multiple carriers. A multi-carrier watermark system includes a watermark embedder and compatible decoder. The embedder encodes auxiliary information, such as a binary message, into the host media signal by modulating message signals with two or more corresponding carrier signals to form a watermark signal and embeds this signal into the host signal. A compatible watermark decoder uses the carrier signals to demodulate the message signals from the watermarked signal.

Further features of the invention will become apparent with reference to the following detailed description and accompanying drawings.

DETAILED DESCRIPTION

Introduction

The following sections describe watermark encoders and decoders that employ multiple carriers. The encoder modulates message signals with a set of carriers and encodes the modulated messages into a media signal, such as audio, image or video signal. Using the known carrier signals, the decoder demodulates the modulated messages from a signal suspected of containing a watermark.

Figure 1:
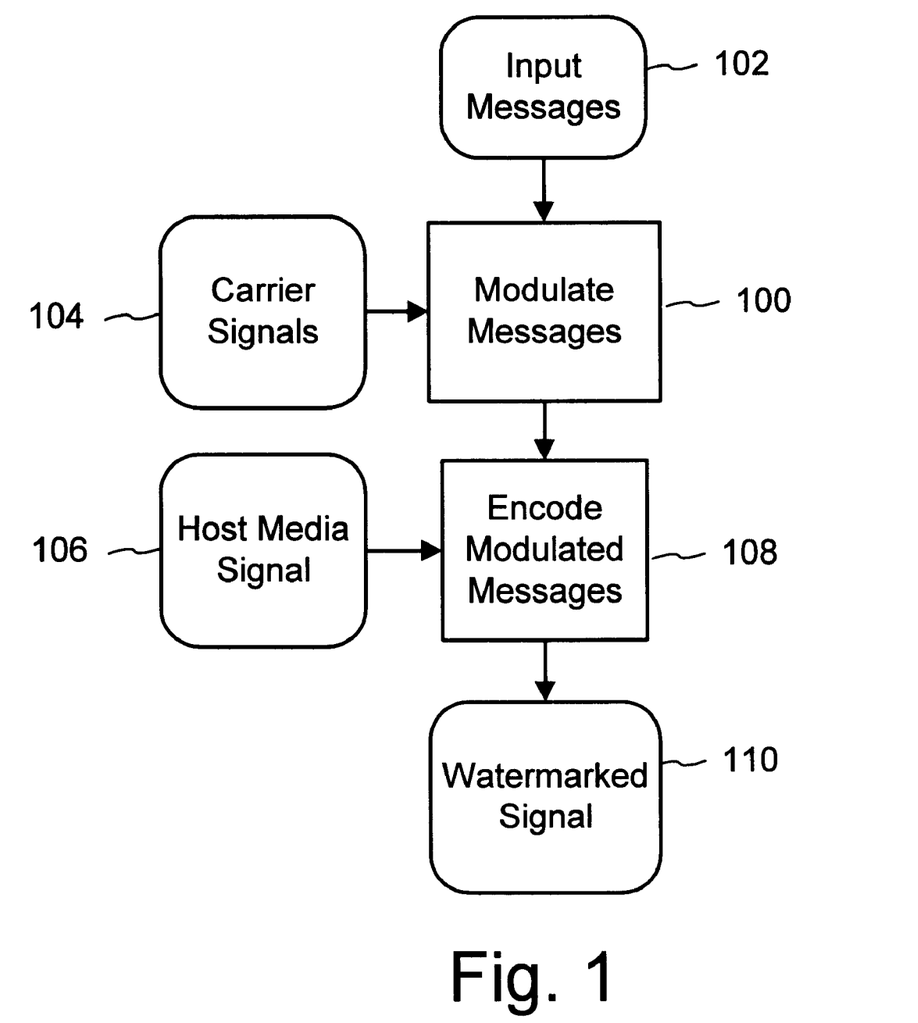
FIG. 1 is a flow diagram illustrating a multi-carrier watermark embedder.

FIG. 1 is a flow diagram illustrating a multi-carrier watermark embedder. A modulator 100 modulates message signals 102 with corresponding carrier signals 104. In this multi-carrier watermarking scheme, the watermark signal, w, is a sum of message signals (f0, f1, f2, f3) modulated by corresponding carriers (c0, c1, c2 . . . ).

$$w = f0 c0 + f1 c1 + f2 c2 + f3 c3 \ldots$$

An encoder 106 then encodes the modulated message signals into a host signal 108 to create a watermark signal 110.

Figure 2:
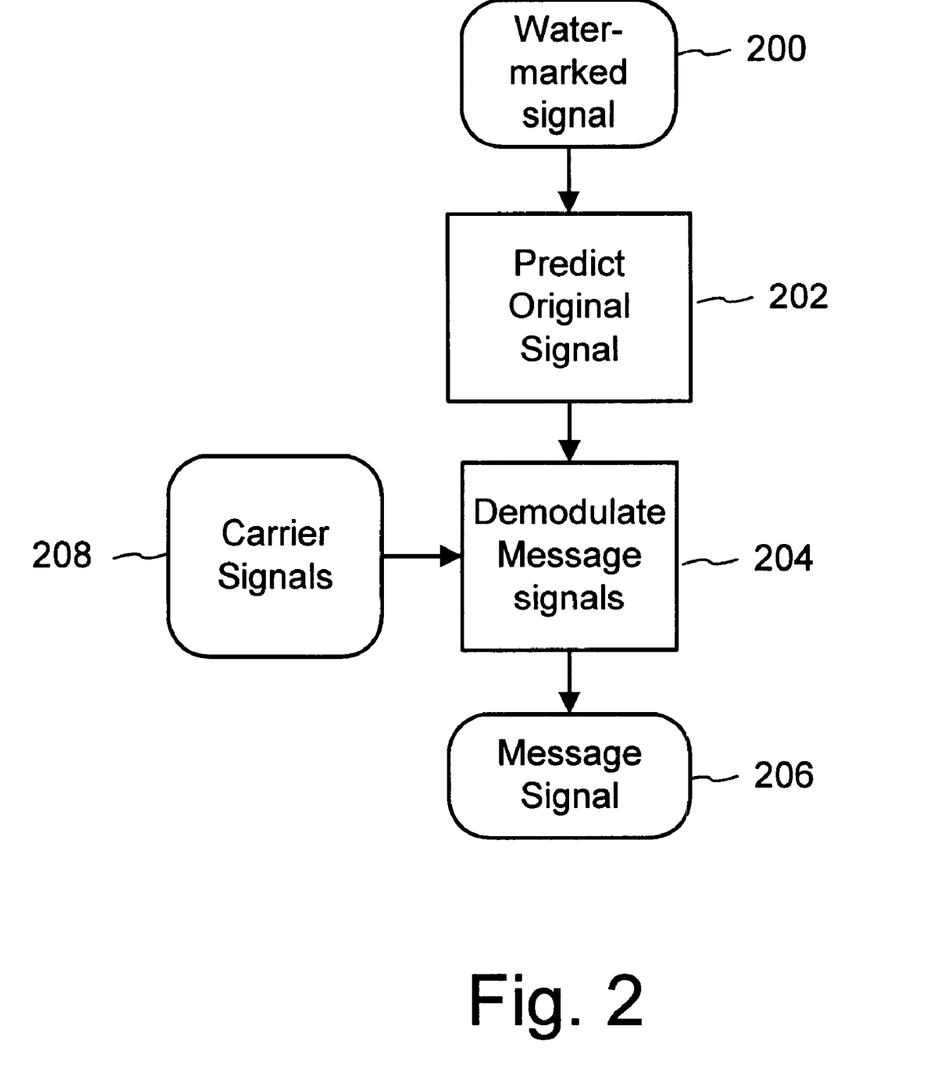
FIG. 2 is a flow diagram illustrating a multi-carrier watermark decoder.

FIG. 2 is a flow diagram illustrating a multi-carrier watermark decoder. The input is a signal 200 suspected of containing a watermark. The decoder predicts the original signal 202, and removes it to compute an estimate of the watermark signal. While this prediction operation is useful to increase the watermark signal to noise ratio, it is not necessary. A demodulator 204 then demodulates message signals 206 from the watermark signal using the carrier signals 208.

Figure 3:
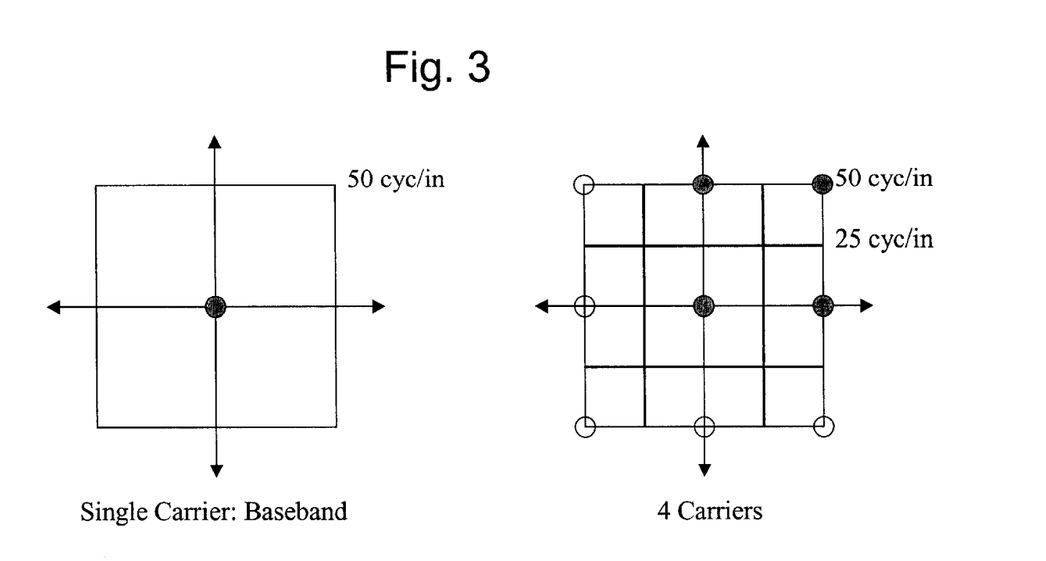
FIG. 3 illustrates an FFT of a single carrier signal and 4 carrier signals.

To illustrate, consider an example of a watermarking scheme for embedding an auxiliary signal into a two-dimensional host signal, such as an image. FIG. 3 illustrates an FFT of a single carrier signal and 4 carrier signals. In this example, the resolution of the host image is 100 dpi, which provides a bandwidth up to 50 cycles per inch. FIG. 3 shows how the available bandwidth up to 50 cycles per inch is divided for examples of a single carrier, and four carriers. The single carrier is at DC, while the four carriers are located at DC, and 50 cycles per inch in horizontal, vertical and diagonal dimensions. The 4 carriers are chosen to equally divide the available bandwidth. This is not a requirement, however.

Figure 4:
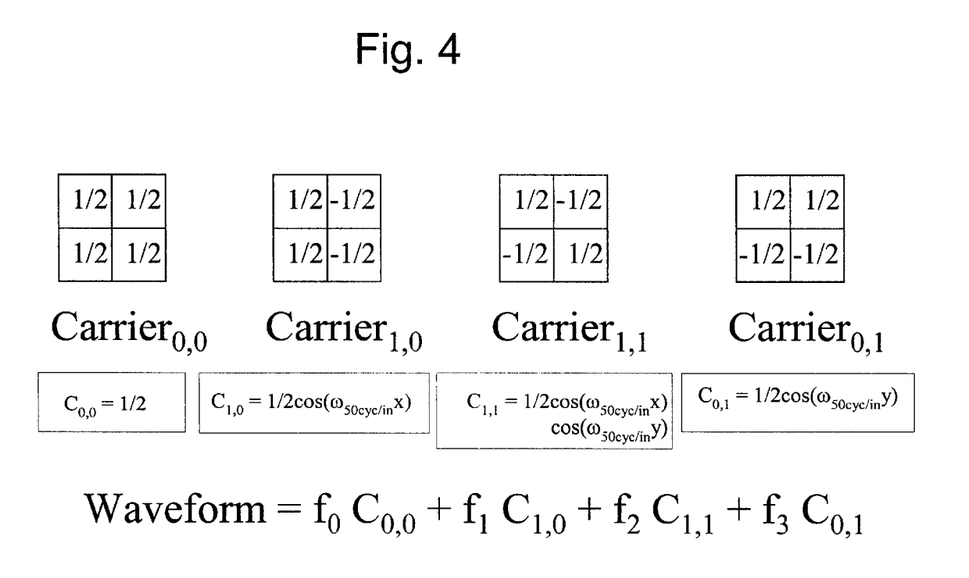
FIG. 4 illustrates an example of modulation functions corresponding to the 4 carrier signals shown in FIG. 3.

In the example of four carriers, each carrier can be represented as a modulation function as shown in FIG. 4. In the digital domain, where continuous functions are sampled (e.g., pixels in a digital image are examples of discrete samples), the modulation functions can be represented by sample sequences as shown in FIG. 4. Because the bandwidth allotted to each carrier is equal to one-half the total bandwidth in the x and y directions, we need only one-half the spatial resolution to represent each band. Stated alternatively, each message sample for the carriers is modulated to 2 by 2 image samples. Larger or smaller bandwidth divisions will require fewer or more image samples on average, respectively.

Referring again to FIG. 4, a watermark signal at each 2 by 2 block is formed by multiplying message sample values (e.g., 1, −1) with corresponding carrier signals and summing the results for each sample.

Figure 5:
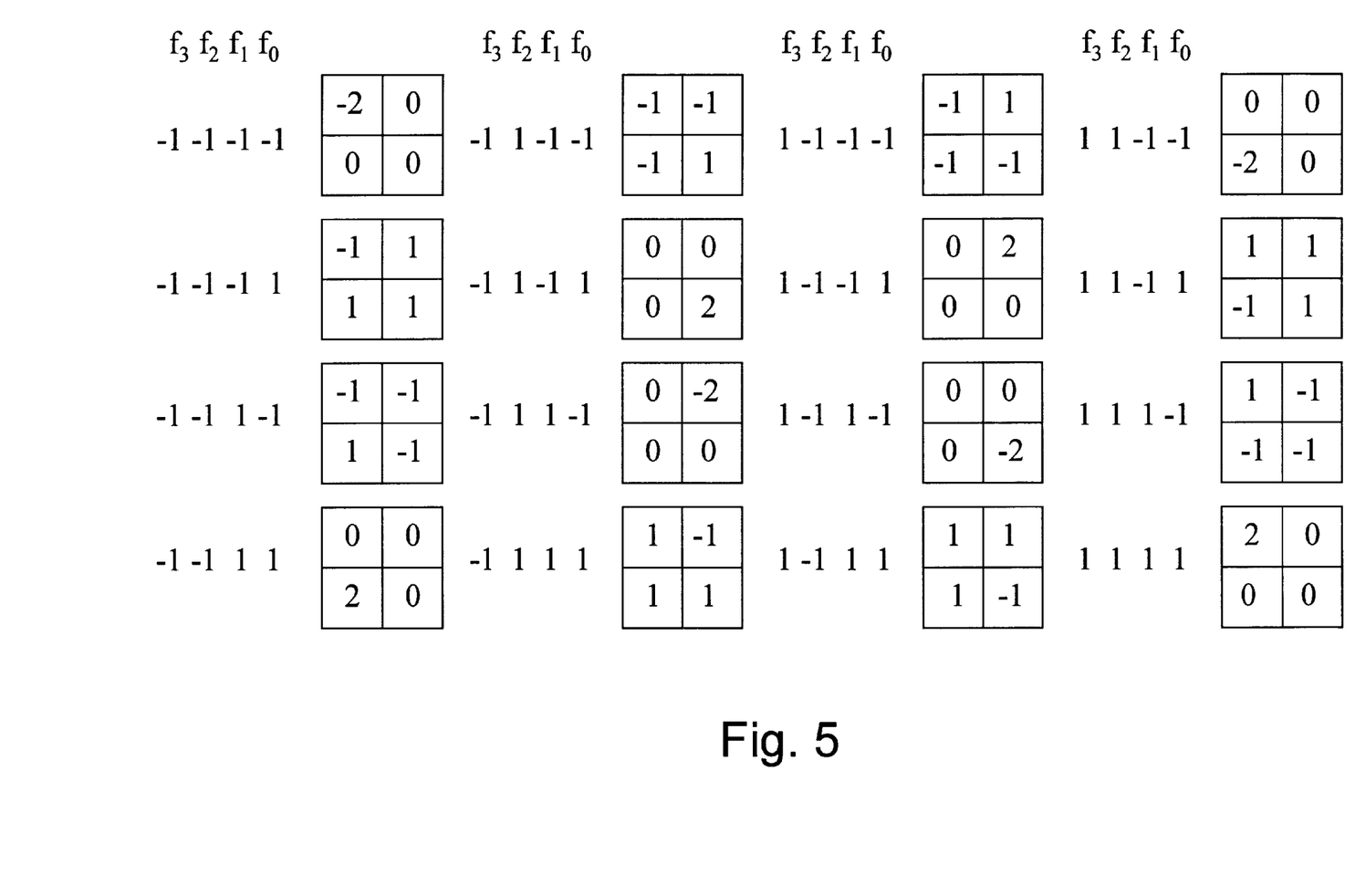
FIG. 5 shows an example of possible watermark signal waveforms generated using the modulation functions of FIG. 4 and message signals in binary antipodal form.

In the case where the message sample values are 1 or −1, the possible waveforms for a 2 by 2 block are shown in FIG. 5. Note that these waveforms include five possible states $\{-2, -1, 0, 1,$ and $2\}$. The waveforms may be applied to the host signal using a variety of encoding functions, which are well documented in literature on digital watermarking.

One form of signaling that is particularly useful in watermark encoding is Binary Phase Shift Keying (BPSK). In this form of signaling, the watermark signal may be represented as a binary anti-podal signal consisting of two states: one and negative one.

Figure 6:
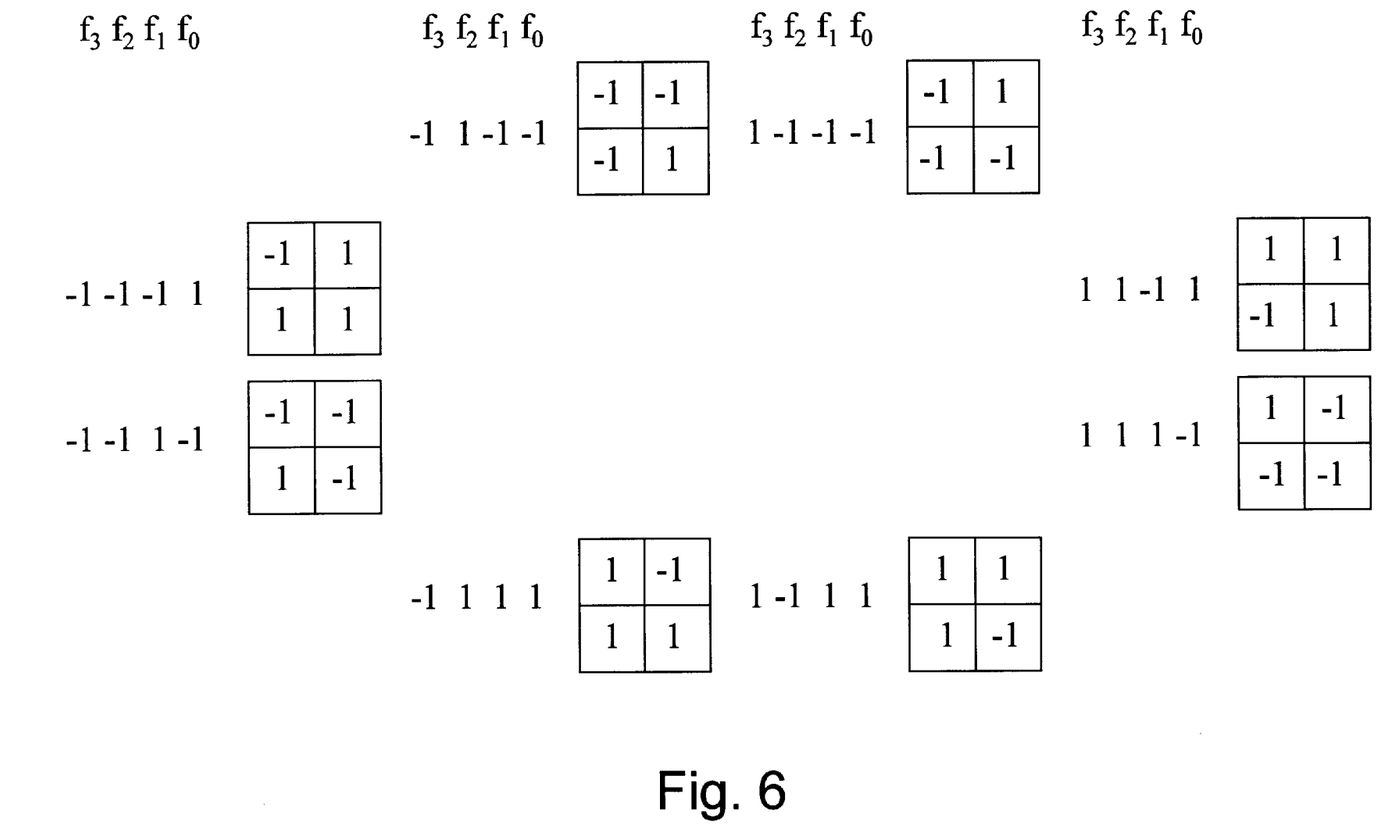
FIG. 6 illustrates a reduced set of possible waveforms when the watermark signal is confined to a binary antipodal form.

The possible waveforms shown in FIG. 5 can be reduced to a set of binary antipodal signals by removing the waveforms that have more than the states of one and negative one. For our running example, this reduces the possible set of waveforms from 16 to 8 as shown in FIG. 6. Observing the remaining waveforms, one can see that there needs to be odd parity between the input message samples, f0, f1, f2, f3. One can arbitrarily select one of the inputs to be the lost degree of freedom due to the odd parity requirement.

Figure 7:
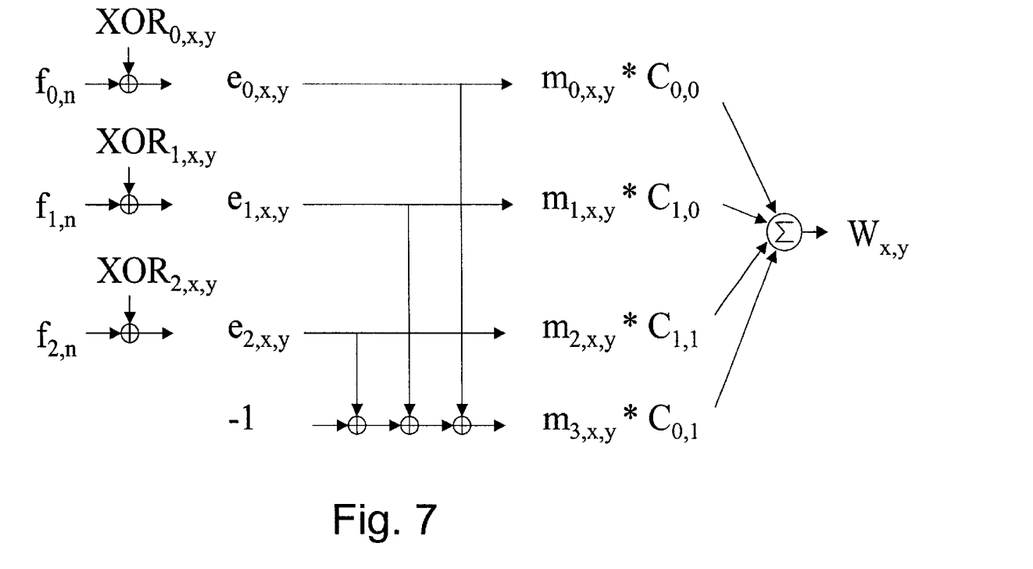
FIG. 7 shows an example of an odd-parity, multi-carrier watermark embedder.

FIG. 7 shows an example of an odd-parity embedder. This embedder employs multiple carrier signals, yet generates a binary antipodal watermark signal. Each of three input message symbols are applied to a spreading function to generate an intermediate input (e0, e1, e2). From these intermediate inputs, the embedder computes the value of a parity bit. The intermediate input values, along with the parity bit, form a set of message sample inputs. These message sample inputs are modulated by corresponding carrier signals and then summed to form a binary antipodal watermark signal.

Figure 8:
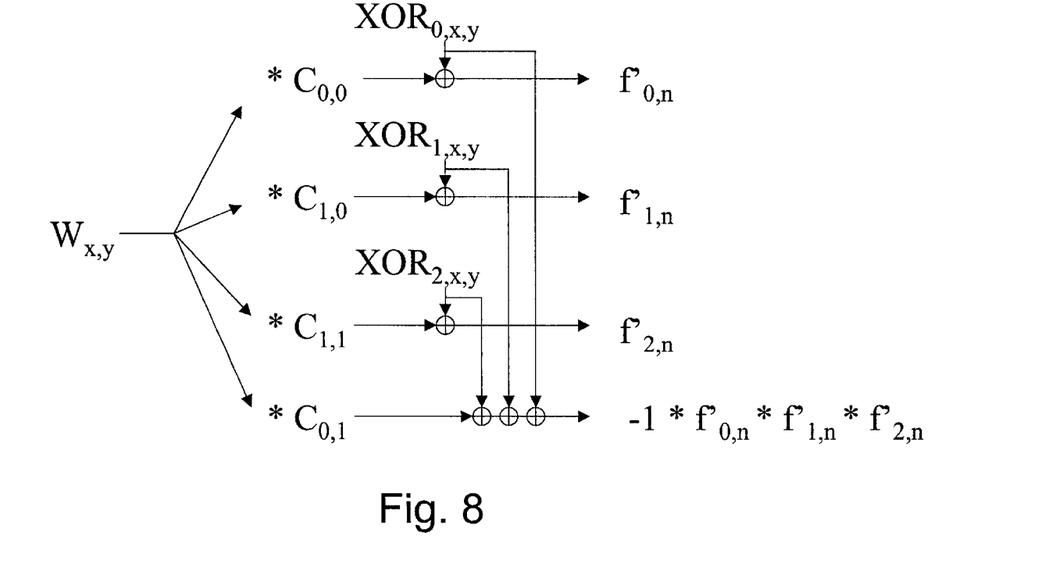
FIG. 8 shows a watermark message demodulator compatible with the embedder of FIG. 7.

FIG. 8 shows a watermark message demodulator compatible with the embedder of FIG. 7. A binary antipodal watermark signal W is input to the demodulator. This signal is demodulated with the carrier functions. The intermediate results from three of the demodulation operations are applied to an inverse of the spreading function to compute the message symbols f0, f1, and f2.

Figure 9:
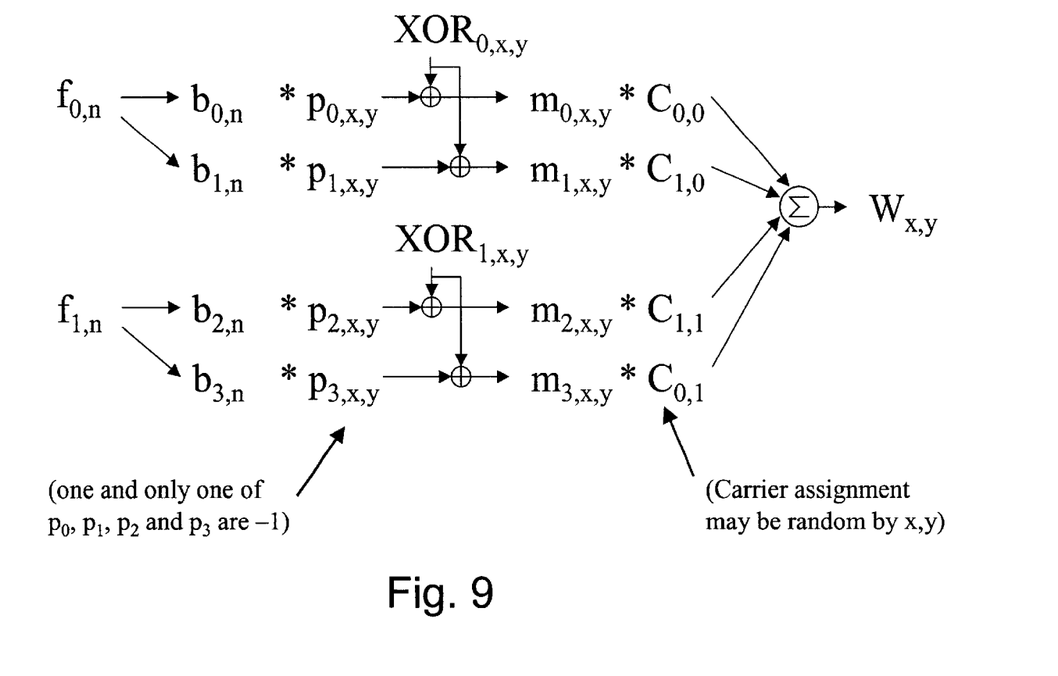
FIG. 9 is a diagram of an alternative multi-carrier watermark embedder.

FIG. 9 is a diagram of an alternative multi-carrier embedder. This embedder allows for two inputs f0, f1, rather than three as in the previous example. This embedder encodes two bits per symbol (f0 and f1) and enforces odd parity on one and even parity on the other. In FIG. 9, the bit values for each input are represented as b0, b1, b2 and b3. Parity control its p0, p1, p2 and p3 are set such that one and only one is set to −1. The bit values are multiplied by the parity control bit and then applied to the spreading function, which is an exclusive OR (XOR) operation. The outputs m0, m1, m2 and m3 are modulated by corresponding carrier signals C0,0, C1,0, C1,1 and C0,1. The resulting modulated signals are summed to form a watermark signal W.

Carrier assignment may be random by position (e.g., x, y coordinates) in the host signal. Such random assignment applies if f0,n or f1,n are repeated a number of times in the image. For example, in some implementations, the message is spread over a pseudorandom number and repeated throughout the host signal. When the message samples are repeated, the instances of the same repeated message samples do not always have to be assigned to the same carrier signals.

Figure 10:
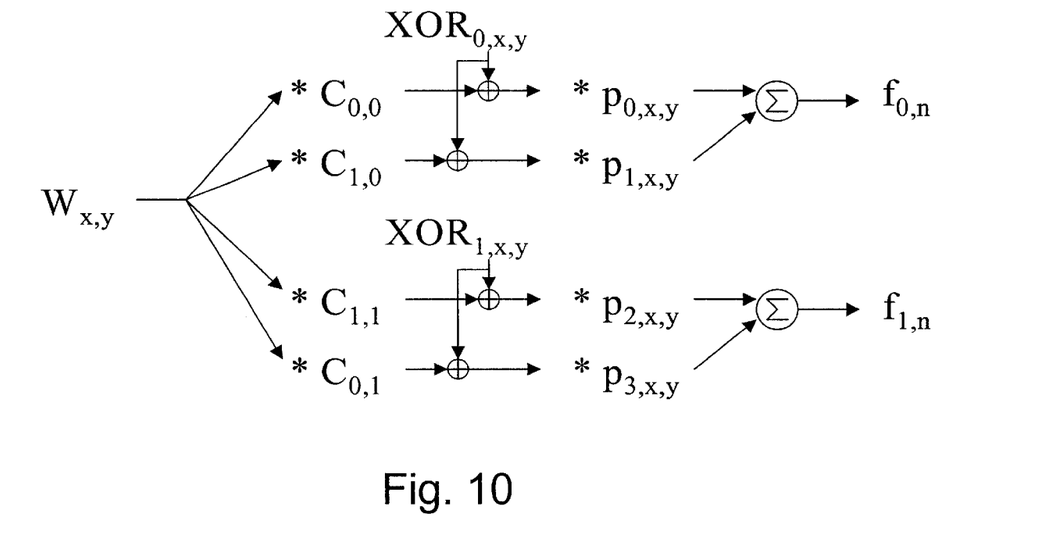
FIG. 10 is a diagram of a watermark demodulator compatible with the embedder shown in FIG. 9.

FIG. 10 is a diagram of a watermark demodulator compatible with the embedder shown in FIG. 9. As depicted in the diagram, the decoding operations reverse the embedding operations. Starting with the watermark signal W (or an estimate of it), the demodulator demodulates the watermark signal with the carrier functions. It then applies the inverse of the spreading function. The resulting values are then multiplied by the parity control bits, and summed to re-construct the message signals.

The example demodulators shown in FIGS. 8 and 10 both apply a demodulation operation on the watermark signal W with a set of carrier signals. A number of different filters may be used to implement these demodulation operations. One approach is to use a set of matched filters corresponding to each of the carrier signals. For example, a matched filtering operation computes the dot product of the sampled carrier signal with the watermarked or estimated watermark signal (e.g., prediction is used to compute the estimated watermark signal from the watermarked signal). In this approach, the demodulator performs a matched filtering between the watermarked or estimated watermark signal and each of the carrier signals.

An alternative approach is to predict the original, un-watermarked signal sample values, derive an estimate of the watermark signal values using the predicted values (e.g., subtracting the predicted from the watermarked signal), and then interpret the meaning of the estimated watermark signal using the set of possible waveforms, for example, in a look up table of sample polarities (e.g., matching the estimated watermark waveform with the set of possible watermark waveforms and selecting the closest match).

Several different types of predictive filters may be used to estimate the original, unwatermarked signal from the watermark signal. Consider a watermark application where a binary antipodal watermark signal W is scaled and then added to the host signal. In reading the watermark signal from a potentially distorted version of the watermarked signal, the objective is to reconstruct a binary antipodal signal representing the watermark signal from a potentially distorted version of the watermarked signal. An estimate of the original signal may be computed by filtering watermarked signal samples in a neighborhood around a sample of interest. One type of predictive filter is to compute an average of the pixels in the neighborhood (e.g., horizontally and vertically adjacent image samples, samples in a square neighborhood around the sample of interest, etc.). By subtracting a predicted sample value from the sample of interest, the demodulator produces a difference value with a polarity that estimates the polarity of the binary antipodal signal at that sample position.

Figure 11:
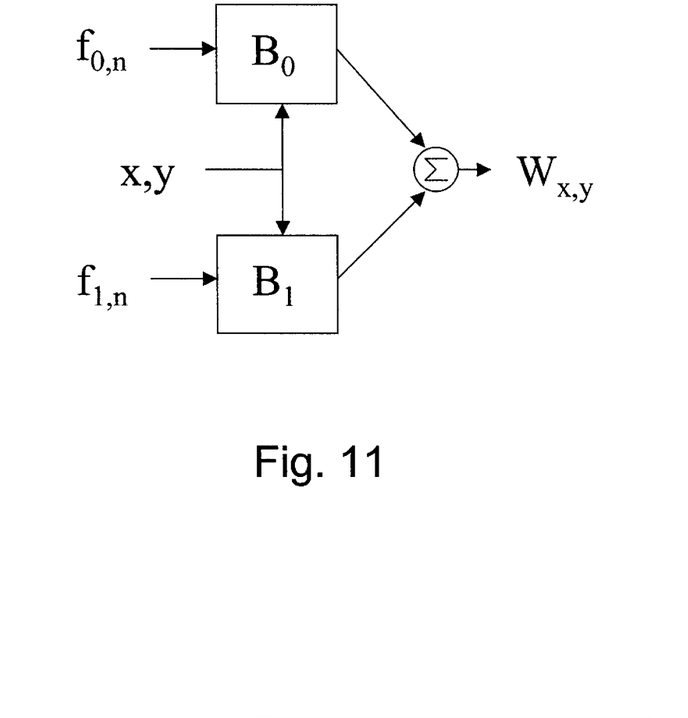
FIG. 11 is a diagram of a watermark embedder in which modulation functions are depicted generally.

To generalize the watermark embedder example, one can view the modulation operations as functional blocks B0 and B1 as shown in FIG. 11. The details of the modulation functions within the functional blocks can vary from one implementation to another.

Figure 12:
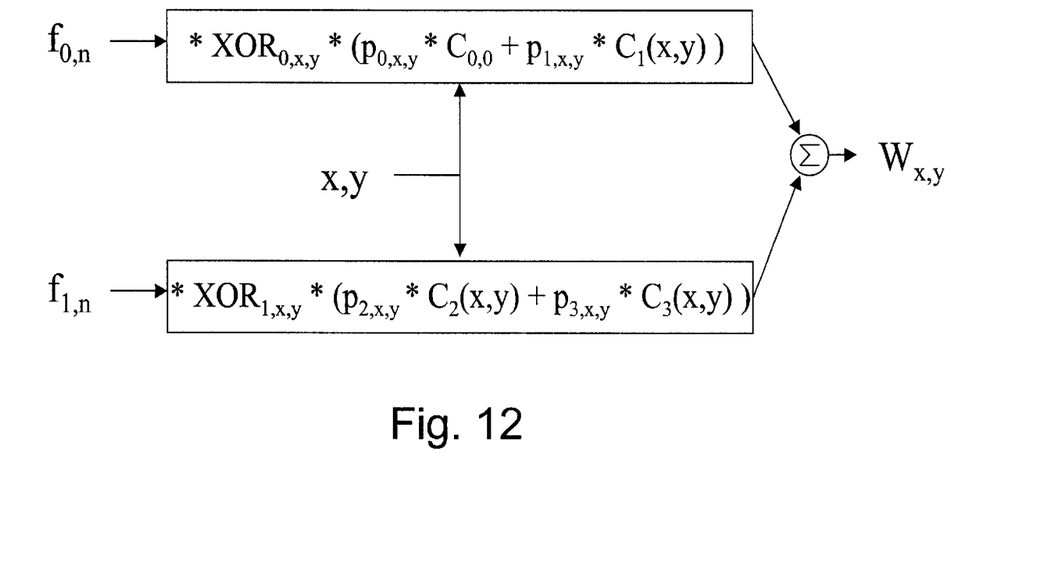
FIG. 12 depicts a specific example of modulation functions that may be employed in he embedder shown in FIG. 11.
Figure 13:
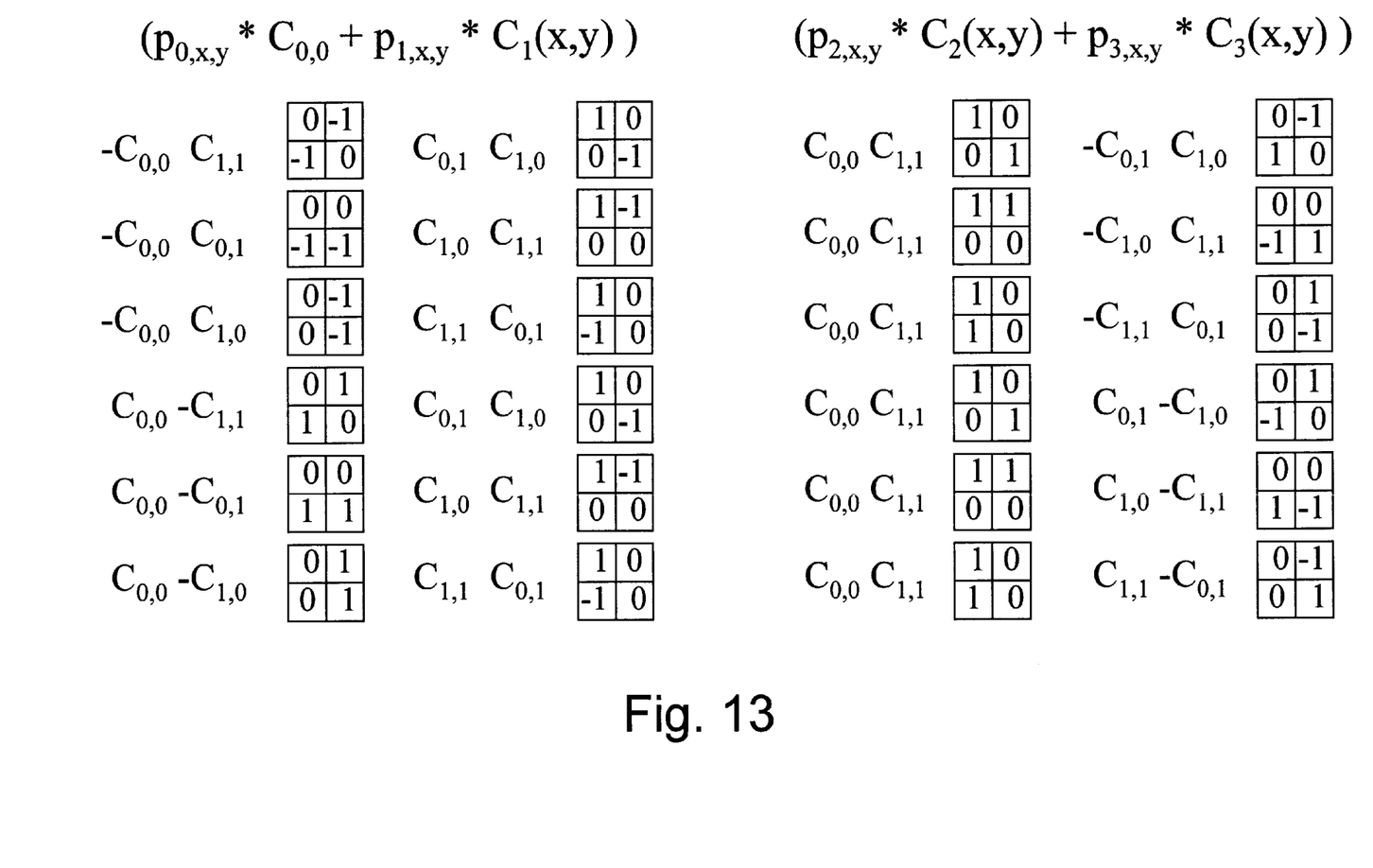
FIG. 13 is a diagram showing an evaluation of the modulation functions of FIG. 12.

FIG. 12, for example, shows the modulation function for the example shown in FIG. 9, rewritten so as to separate the spreading function from the modulation functions. FIG. 13 shows the modulation functions within each of the functional blocks B0 and B1. By observation, one can see that the two modulation functions affect mutually exclusive sets of samples in the host signal.

In view of the properties of the multi-carrier embedder illustrated in FIGS. 9, 12 and 13, it may be implemented in a watermark embedder as follows. The message to be embedded has two components f0,m and f1,n. Each of these components is a binary sequence. The same or different messages may be encoded in these sequences. The embedder employs a spreading function, in particular an Exclusive OR function, that spreads the message symbols in these binary sequences over a pseudo random carrier sequence.

The resulting binary sequences include a set of chips that are mapped to locations within the host signal via a scatter pattern. In the case of an image watermark embedder employing the carrier functions depicted in FIG. 4, the locations in the host image are 2 by 2 squares of image samples at a predetermined resolution. These locations are preferably spread throughout an image or portion of an image to be embedded. The watermark message may be repeated in several portions of the host signal, e.g., chunks or blocks of host signal samples or transform coefficients. Each of these portions may employ the same or different scatter patterns.

The embedder employs random carrier assignments and parity multiplier assignments for each 2 by 2 square. The carriers, parity multipliers and pseudo random sequence values are each in the form of a binary antipodal signal. As such, they may be combined into a single table that maps input message sample values to a corresponding watermark sample values in a watermark signal.

A watermark decoder compatible with this encoding scheme may be implemented as illustrated in FIG. 10 and described above. Because the message has at least two carriers, there is flexibility in the manner in which the decoder can exploit this attribute to read a message. If one message is modulated at a low frequency carrier signal (e.g., a DC carrier) and another message is modulated at one or more higher frequency carriers, the decoder can selectively read messages at each of the different carrier frequencies. In some applications, the message at the low frequency carrier may survive better. In these applications, the decoder can perform a low pass read operation to extract the message conveyed via the low frequency carrier. In particular, the decoder filters and downsamples the watermarked signal to a low resolution that still encompasses the low frequency carrier. It then demodulates the watermark message with the low frequency carrier signal. Alternatively, the low frequency carrier may be affected more by the unmarked image, so only the high frequency carriers need to be read.

To demodulate messages conveyed at each of the carriers, the decoder may employ correlation with the corresponding carrier signals. One form of correlation is to perform matched filtering with a reference signal representing the carrier signal, e.g., calculate a dot product of the carrier with the watermark signal.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the watermark encoding processes may be incorporated into a watermark encoding system implemented in a programmable computer or a special purpose digital circuit. Similarly, watermark decoding, including watermark detecting and reading a watermark message, may be implemented in software, firmware, hardware, or combinations of software, firmware and hardware. The methods and processes described above may be implemented in programs executed from a system's memory (a computer readable medium, such as an electronic, optical or magnetic storage device). Additionally, content encoded with watermarks may be distributed on packaged media, such as optical disks, flash memory cards, magnetic storage devices, or distributed in an electronic file format. The watermarks may be decoded from content stored on machine readable media, including electronic, optical, and magnetic storage media. Image watermarks may be embedded in images placed on physical objects, such as paper, ID cards, packaging, etc. and may be extracted from electronic images captured of these objects. Audio watermarks may be encoded in a manner that survives digital to analog and analog to digital conversion.

The particular combinations of elements and features in the above-detailed embodiments are exemplary only; the interchanging and substitution of these teachings with other teachings in this and the incorporated-by-reference patents/applications are also contemplated.

I claim:

1. A method for encoding auxiliary information in a media signal comprising:
    modulating two or more messages with a corresponding carrier signal, each of the carrier signals being at different frequencies;
    multiplying each message with a corresponding carrier signal to compute modulated messages; and
    combining the two or more modulated messages with the media signal to form a watermarked signal in which the modulated messages are substantially imperceptible yet recoverable by an automated decoding process.

2. The method of claim 1 wherein the two or more messages are the same messages.

3. The method of claim 1 wherein each of the two or more messages are modulated with carrier signals such that their frequency ranges are mutually exclusive.

4. The method of claim 1 wherein the media signal is an image.

5. The method of claim 4 wherein the modulated messages are combined with the image by adding modulated messages to the image.

6. The method of claim 5 wherein the modulated message are added to the image in a spatial domain.

7. The method of claim 1 wherein the modulated messages are in the form of a binary antipodal signal.

8. A computer readable medium having software for performing the method of claim 1.

9. A method of for decoding auxiliary information embedded in a media signal comprising:
    reading a media signal including a watermark signal;
    extracting the watermark signal from the media signal; and
    demodulating two or more message signals from the watermark signal with corresponding carrier signals by multiplying the watermark signal with a corresponding carrier signal to compute the messages, wherein each of the carrier signals are at different frequencies.

10. The method of claim 9 wherein the two or more messages are the same messages.

11. The method of claim 9 wherein each of the two or more messages are modulated with carrier signals that are confined to exclusive frequency ranges.

12. The method of claim 9 wherein the media signal is an image signal.

13. The method of claim 9 wherein demodulating includes performing an inverse spreading operation on the watermark signal.

14. A computer readable medium having software for performing the method of claim 9.

15. The method of claim 9 wherein the extracted watermark signal comprises a binary antipodal signal and multiplying the extracted watermark signal by the corresponding carriers produces binary antipodal signals from which the messages are extracted.

16. A method for encoding auxiliary information in a media signal comprising:

modulating two or more different messages with a corresponding carrier signal, each of the carrier signals being at different frequencies; and combining the two or more modulated messages with the media signal to form a watermarked signal in which the modulated messages are substantially imperceptible yet recoverable by an automated decoding process.

17. A computer readable medium having software for performing the method of claim 16.

18. A method for encoding auxiliary information in a media signal comprising:

modulating two or more messages with a corresponding carrier signal to form antipodal signals corresponding to each message, each of the carrier signals being at different frequencies, and the antipodal message signals being formed such that a sum of the antipodal message signals is a binary antipodal signal;

summing the antipodal message signals to form a binary antipodal watermark signal;

combining the binary antipodal watermark signal with the media signal to form a watermarked signal in which the modulated messages are substantially imperceptible yet recoverable by an automated decoding process.

19. A computer readable medium having software for performing the method of claim 18.

\* \* \* \* \*